(12) United States Patent
Piwonka et al.

(10) Patent No.: US 10,949,237 B2
(45) Date of Patent: Mar. 16, 2021

(54) OPERATING SYSTEM CUSTOMIZATION IN AN ON-DEMAND NETWORK CODE EXECUTION SYSTEM

(71) Applicant: Amazon Technologies, Inc., Seattle, WA (US)

(72) Inventors: Philip Daniel Piwonka, Seattle, WA (US); Timothy Allen Wagner, Seattle, WA (US); Niall Mullen, Seattle, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 16/023,852

(22) Filed: Jun. 29, 2018

(65) Prior Publication Data
US 2020/0004571 A1    Jan. 2, 2020

(51) Int. Cl.
*G06F 9/455* (2018.01)
*G06F 8/30* (2018.01)
*G06F 9/54* (2006.01)

(52) U.S. Cl.
CPC ............ *G06F 9/45558* (2013.01); *G06F 8/30* (2013.01); *G06F 9/547* (2013.01); *G06F 2009/4557* (2013.01)

(58) Field of Classification Search
CPC ........ G06F 9/45558; G06F 8/30; G06F 9/547; G06F 9/455; G06F 2009/45562; G06F 2009/4557
See application file for complete search history.

(56) References Cited

U.S. PATENT DOCUMENTS 4,949,254 A   8/1990   Shorter
5,283,888 A   2/1994   Dao et al.
(Continued)

FOREIGN PATENT DOCUMENTS

EP    2663052 A1    11/2013
JP    2002287974 A   10/2002
(Continued)

OTHER PUBLICATIONS

International Search Report and Written Opinion dated Oct. 15, 2019 for International Application No. PCT/US2019/039246 in 16 pages.
(Continued)

*Primary Examiner* — Benjamin C Wu
(74) *Attorney, Agent, or Firm* — Knobbe, Martens, Olson & Bear, LLP

(57) ABSTRACT

Systems and methods are described for managing operating system customization in an on-demand code execution system in a manner that enables efficient execution of code. A user may generate a task on the system by submitting code. The system may determine the operating system functions that the submitted code may invoke when executed on the system, and may determine whether the required functionality can be provided by a customized operating system. The customized operating system may provide some functionality but omit other functionality, and thereby avoid consuming any resources associated with making the omitted functionality available. For example, the system may determine that the user-submitted code does not require filesystem interactions, network interactions, interactions with particular devices, caching, paging, profiling, etc., and may thus provide an operating system that does not include one or more of these services.

20 Claims, 7 Drawing Sheets

(56) References Cited

U.S. PATENT DOCUMENTS

| | | | |
|---|---|---|---|
| 5,835,764 A * | 11/1998 | Platt | G06F 9/466 |
| | | | 718/101 |
| 5,970,488 A | 10/1999 | Crowe et al. | |
| 6,260,058 B1 | 7/2001 | Hoenninger et al. | |
| 6,385,636 B1 | 5/2002 | Suzuki | |
| 6,463,509 B1 | 10/2002 | Teoman et al. | |
| 6,501,736 B1 | 12/2002 | Smolik et al. | |
| 6,523,035 B1 | 2/2003 | Fleming et al. | |
| 6,549,936 B1 | 4/2003 | Hirabayashi | |
| 6,708,276 B1 | 3/2004 | Yarsa et al. | |
| 7,036,121 B1 | 4/2006 | Casabona et al. | |
| 7,340,522 B1 * | 3/2008 | Basu | G06F 9/5033 |
| | | | 709/217 |
| 7,577,722 B1 * | 8/2009 | Khandekar | G06F 9/45558 |
| | | | 709/220 |
| 7,590,806 B2 | 9/2009 | Harris et al. | |
| 7,665,090 B1 | 2/2010 | Tormasov et al. | |
| 7,707,579 B2 | 4/2010 | Rodriguez | |
| 7,730,464 B2 | 6/2010 | Trowbridge | |
| 7,774,191 B2 | 8/2010 | Berkowitz et al. | |
| 7,823,186 B2 | 10/2010 | Pouliot | |
| 7,831,464 B1 | 11/2010 | Nichols et al. | |
| 7,870,153 B2 | 1/2011 | Croft et al. | |
| 7,886,021 B2 | 2/2011 | Scheifler et al. | |
| 7,949,677 B2 | 5/2011 | Croft et al. | |
| 7,954,150 B2 | 5/2011 | Croft et al. | |
| 8,010,679 B2 | 8/2011 | Low et al. | |
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,051,180 B2 | 11/2011 | Mazzaferri et al. | |
| 8,051,266 B2 | 11/2011 | DeVal et al. | |
| 8,065,676 B1 | 11/2011 | Sahai et al. | |
| 8,065,682 B2 | 11/2011 | Baryshnikov et al. | |
| 8,095,931 B1 | 1/2012 | Chen et al. | |
| 8,127,284 B2 | 2/2012 | Meijer et al. | |
| 8,146,073 B2 | 3/2012 | Sinha | |
| 8,166,304 B2 | 4/2012 | Murase et al. | |
| 8,171,473 B2 | 5/2012 | Lavin | |
| 8,201,026 B1 | 6/2012 | Bornstein et al. | |
| 8,209,695 B1 | 6/2012 | Pruyne et al. | |
| 8,219,987 B1 | 7/2012 | Vlaovic et al. | |
| 8,321,554 B2 | 11/2012 | Dickinson | |
| 8,321,558 B1 | 11/2012 | Sirota et al. | |
| 8,336,079 B2 | 12/2012 | Budko et al. | |
| 8,352,608 B1 | 1/2013 | Keagy et al. | |
| 8,387,075 B1 | 2/2013 | McCann et al. | |
| 8,429,282 B1 | 4/2013 | Ahuja | |
| 8,448,165 B1 | 5/2013 | Conover | |
| 8,490,088 B2 | 7/2013 | Tang | |
| 8,555,281 B1 | 10/2013 | Van Dijk et al. | |
| 8,566,835 B2 | 10/2013 | Wang et al. | |
| 8,601,323 B2 | 12/2013 | Tsantilis | |
| 8,613,070 B1 | 12/2013 | Borzycki et al. | |
| 8,615,589 B1 | 12/2013 | Adogla et al. | |
| 8,631,130 B2 | 1/2014 | Jackson | |
| 8,667,471 B2 | 3/2014 | Wintergerst et al. | |
| 8,677,359 B1 | 3/2014 | Cavage et al. | |
| 8,694,996 B2 | 4/2014 | Cawlfield et al. | |
| 8,700,768 B2 | 4/2014 | Benari | |
| 8,719,415 B1 | 5/2014 | Sirota et al. | |
| 8,725,702 B1 | 5/2014 | Raman et al. | |
| 8,756,696 B1 | 6/2014 | Miller | |
| 8,769,519 B2 | 7/2014 | Leitman et al. | |
| 8,799,236 B1 | 8/2014 | Azari et al. | |
| 8,799,879 B2 | 8/2014 | Wright et al. | |
| 8,806,468 B2 | 8/2014 | Meijer et al. | |
| 8,806,644 B1 * | 8/2014 | McCorkendale | H04L 63/1416 |
| | | | 726/24 |
| 8,819,679 B2 | 8/2014 | Agarwal et al. | |
| 8,825,863 B2 | 9/2014 | Hansson et al. | |
| 8,825,964 B1 | 9/2014 | Sopka et al. | |
| 8,839,035 B1 | 9/2014 | Dimitrovich et al. | |
| 8,850,432 B2 | 9/2014 | McGrath et al. | |
| 8,869,300 B2 | 10/2014 | Singh et al. | |
| 8,874,952 B2 | 10/2014 | Tameshige et al. | |
| 8,904,008 B2 | 12/2014 | Calder et al. | |
| 8,966,495 B2 | 2/2015 | Kulkarni | |
| 8,997,093 B2 | 3/2015 | Dimitrov | |
| 9,027,087 B2 | 5/2015 | Ishaya et al. | |
| 9,038,068 B2 | 5/2015 | Engle et al. | |
| 9,052,935 B1 | 6/2015 | Rajaa | |
| 9,086,897 B2 | 7/2015 | Oh et al. | |
| 9,086,924 B2 | 7/2015 | Barsness et al. | |
| 9,092,837 B2 | 7/2015 | Bala et al. | |
| 9,098,528 B2 | 8/2015 | Wang | |
| 9,110,732 B1 | 8/2015 | Forschmiedt et al. | |
| 9,110,770 B1 | 8/2015 | Raju et al. | |
| 9,111,037 B1 | 8/2015 | Nalis et al. | |
| 9,112,813 B2 | 8/2015 | Jackson | |
| 9,141,410 B2 | 9/2015 | Leafe et al. | |
| 9,146,764 B1 | 9/2015 | Wagner | |
| 9,152,406 B2 | 10/2015 | De et al. | |
| 9,164,754 B1 | 10/2015 | Pohlack | |
| 9,183,019 B2 | 11/2015 | Kruglick | |
| 9,208,007 B2 | 12/2015 | Harper et al. | |
| 9,218,190 B2 | 12/2015 | Anand et al. | |
| 9,223,561 B2 | 12/2015 | Orveillon et al. | |
| 9,223,966 B1 | 12/2015 | Satish et al. | |
| 9,250,893 B2 | 2/2016 | Blahaerath et al. | |
| 9,268,586 B2 | 2/2016 | Voccio et al. | |
| 9,298,633 B1 | 3/2016 | Zhao et al. | |
| 9,317,689 B2 | 4/2016 | Aissi | |
| 9,323,556 B2 | 4/2016 | Wagner | |
| 9,361,145 B1 | 6/2016 | Wilson et al. | |
| 9,413,626 B2 | 8/2016 | Reque et al. | |
| 9,436,555 B2 | 9/2016 | Dornemann et al. | |
| 9,461,996 B2 | 10/2016 | Hayton et al. | |
| 9,471,775 B1 | 10/2016 | Wagner et al. | |
| 9,483,335 B1 | 11/2016 | Wagner et al. | |
| 9,489,227 B2 | 11/2016 | Oh et al. | |
| 9,497,136 B1 | 11/2016 | Ramarao et al. | |
| 9,501,345 B1 | 11/2016 | Lietz et al. | |
| 9,514,037 B1 | 12/2016 | Dow et al. | |
| 9,537,788 B2 | 1/2017 | Reque et al. | |
| 9,575,798 B2 | 2/2017 | Terayama et al. | |
| 9,588,790 B1 | 3/2017 | Wagner et al. | |
| 9,594,590 B2 | 3/2017 | Hsu | |
| 9,596,350 B1 | 3/2017 | Dymshyts et al. | |
| 9,600,312 B2 | 3/2017 | Wagner et al. | |
| 9,628,332 B2 | 4/2017 | Bruno, Jr. et al. | |
| 9,635,132 B1 | 4/2017 | Lin et al. | |
| 9,652,306 B1 | 5/2017 | Wagner et al. | |
| 9,652,617 B1 | 5/2017 | Evans et al. | |
| 9,654,508 B2 | 5/2017 | Barton et al. | |
| 9,661,011 B1 | 5/2017 | Van Horenbeeck et al. | |
| 9,678,773 B1 | 6/2017 | Wagner et al. | |
| 9,678,778 B1 | 6/2017 | Youseff | |
| 9,703,681 B2 | 7/2017 | Taylor et al. | |
| 9,715,402 B2 | 7/2017 | Wagner et al. | |
| 9,727,725 B2 | 8/2017 | Wagner et al. | |
| 9,733,967 B2 | 8/2017 | Wagner et al. | |
| 9,760,387 B2 | 9/2017 | Wagner et al. | |
| 9,760,443 B2 | 9/2017 | Tarasuk-Levin et al. | |
| 9,767,271 B2 | 9/2017 | Ghose | |
| 9,785,476 B2 | 10/2017 | Wagner et al. | |
| 9,787,779 B2 | 10/2017 | Frank et al. | |
| 9,811,363 B1 | 11/2017 | Wagner | |
| 9,811,434 B1 | 11/2017 | Wagner | |
| 9,817,695 B2 | 11/2017 | Clark | |
| 9,830,175 B1 | 11/2017 | Wagner | |
| 9,830,193 B1 | 11/2017 | Wagner et al. | |
| 9,830,449 B1 | 11/2017 | Wagner | |
| 9,864,636 B1 | 1/2018 | Patel et al. | |
| 9,910,713 B2 | 3/2018 | Wisniewski et al. | |
| 9,921,864 B2 | 3/2018 | Singaravelu et al. | |
| 9,928,108 B1 | 3/2018 | Wagner et al. | |
| 9,929,916 B1 | 3/2018 | Subramanian et al. | |
| 9,930,103 B2 | 3/2018 | Thompson | |
| 9,930,133 B2 | 3/2018 | Susarla et al. | |
| 9,952,896 B2 | 4/2018 | Wagner et al. | |
| 9,977,691 B2 | 5/2018 | Marriner et al. | |
| 9,979,817 B2 | 5/2018 | Huang et al. | |
| 10,002,026 B1 | 6/2018 | Wagner | |

(56) References Cited

U.S. PATENT DOCUMENTS

| | | |
|---|---|---|
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,360,067 B1 * | 7/2019 | Wagner .............. G06F 9/45558 |
| 10,365,985 B2 | 7/2019 | Wagner |
| 10,387,177 B2 | 8/2019 | Wagner et al. |
| 10,402,231 B2 | 9/2019 | Marriner et al. |
| 10,437,629 B2 | 10/2019 | Wagner et al. |
| 10,445,140 B1 | 10/2019 | Sagar et al. |
| 10,459,822 B1 * | 10/2019 | Gondi ................. G06F 11/3604 |
| 10,503,626 B2 | 12/2019 | Idicula et al. |
| 10,528,390 B2 | 1/2020 | Brooker et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,623,476 B2 | 4/2020 | Thompson |
| 10,649,749 B1 | 5/2020 | Brooker et al. |
| 10,691,498 B2 | 6/2020 | Wagner |
| 10,713,080 B1 | 7/2020 | Brooker et al. |
| 10,725,752 B1 | 7/2020 | Wagner et al. |
| 10,725,826 B1 | 7/2020 | Sagar et al. |
| 10,754,701 B1 | 8/2020 | Wagner |
| 10,776,171 B2 | 9/2020 | Wagner et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |

(56) References Cited

U.S. PATENT DOCUMENTS

| | | |
|---|---|---|
| 2010/0269109 A1 | 10/2010 | Cartales |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2011/0010690 A1 | 1/2011 | Howard et al. |
| 2011/0010722 A1 | 1/2011 | Matsuyama |
| 2011/0023026 A1* | 1/2011 | Oza .......................... G06F 8/63 718/1 |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265067 A1 | 10/2011 | Schulte et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0204164 A1 | 8/2012 | Castanos et al. |
| 2012/0222038 A1 | 8/2012 | Katragadda et al. |
| 2012/0233464 A1 | 9/2012 | Miller et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0151587 A1 | 6/2013 | Takeshima et al. |
| 2013/0151648 A1 | 6/2013 | Luna |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |

(56) References Cited

U.S. PATENT DOCUMENTS

| | | |
|---|---|---|
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143381 A1 | 5/2015 | Chin et al. |
| 2015/0163231 A1 | 6/2015 | Sobko et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092251 A1* | 3/2016 | Wagner .................. G06F 9/542 718/1 |
| 2016/0092320 A1 | 3/2016 | Baca |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0117163 A1 | 4/2016 | Fukui et al. |
| 2016/0117254 A1 | 4/2016 | Susarla et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0177391 A1* | 6/2017 | Wagner .................. G06F 9/4881 |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0329578 A1 | 11/2017 | Iscen |
| 2017/0346808 A1 | 11/2017 | Anzai et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0046453 A1 | 2/2018 | Nair et al. |
| 2018/0046482 A1 | 2/2018 | Karve et al. |
| 2018/0060221 A1 | 3/2018 | Yim et al. |
| 2018/0067841 A1 | 3/2018 | Mahimkar |
| 2018/0081717 A1 | 3/2018 | Li |
| 2018/0095738 A1 | 4/2018 | Dürkop et al. |
| 2018/0143865 A1 | 5/2018 | Wagner et al. |
| 2018/0150339 A1 | 5/2018 | Pan et al. |
| 2018/0192101 A1 | 7/2018 | Bilobrov |
| 2018/0239636 A1 | 8/2018 | Arora et al. |
| 2018/0253333 A1 | 9/2018 | Gupta |

(56) References Cited

U.S. PATENT DOCUMENTS

| | | | |
|---|---|---|---|
| 2018/0275987 | A1 | 9/2018 | Vandeputte |
| 2018/0285101 | A1 | 10/2018 | Yahav et al. |
| 2018/0341504 | A1 | 11/2018 | Kissell |
| 2019/0072529 | A1 | 3/2019 | Andrawes et al. |
| 2019/0108058 | A1 | 4/2019 | Wagner et al. |
| 2019/0140831 | A1 | 5/2019 | De Lima Junior et al. |
| 2019/0155629 | A1 | 5/2019 | Wagner et al. |
| 2019/0171470 | A1 | 6/2019 | Wagner |
| 2019/0179725 | A1 | 6/2019 | Mital et al. |
| 2019/0180036 | A1 | 6/2019 | Shukla |
| 2019/0196884 | A1 | 6/2019 | Wagner |
| 2019/0227849 | A1 | 7/2019 | Wisniewski et al. |
| 2019/0235848 | A1 | 8/2019 | Swiecki et al. |
| 2019/0250937 | A1 | 8/2019 | Thomas et al. |
| 2019/0286475 | A1 | 9/2019 | Mani |
| 2019/0303117 | A1 | 10/2019 | Kocberber et al. |
| 2019/0361802 | A1 | 11/2019 | Li et al. |
| 2019/0384647 | A1 | 12/2019 | Reque et al. |
| 2019/0391834 | A1 | 12/2019 | Mullen et al. |
| 2019/0391841 | A1* | 12/2019 | Mullen ................. G06F 9/5077 |
| 2020/0007456 | A1* | 1/2020 | Greenstein ............ H04L 47/823 |
| 2020/0026527 | A1 | 1/2020 | Xu et al. |
| 2020/0057680 | A1 | 2/2020 | Marriner et al. |
| 2020/0104198 | A1 | 4/2020 | Hussels et al. |
| 2020/0104378 | A1 | 4/2020 | Wagner et al. |
| 2020/0110691 | A1 | 4/2020 | Bryant et al. |
| 2020/0142724 | A1 | 5/2020 | Wagner et al. |
| 2020/0192707 | A1 | 6/2020 | Brooker et al. |

FOREIGN PATENT DOCUMENTS

| | | |
|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098445 A1 | 5/2018 |
| WO | WO 2020/005764 A1 | 1/2020 |
| WO | WO 2020/069104 A1 | 4/2020 |

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Bhadani et al., Performance evaluation of web servers using central load balancing policy over virtual machines on cloud, Jan. 2010, 4 pages.

CodeChef ADMIN discussion web page, retrieved from https://discuss.codechef.com/t/what-are-the-memory-limit-and-stack-size-on-codechef/14159, 2019.

CodeChef IDE web page, Code, Compile & Run, retrieved from http://www.codechef.com/ide, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, 2014, 13 pages.

Deis, Container, 2014, 1 page.

Dombrowski, M., et al., Dynamic Monitor Allocation in the Java Virtual Machine, JTRES '13, Oct. 9-11, 2013, pp. 30-37.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Ha et al., A Concurrent Trace-based Just-In-Time Compiler for Single-threaded JavaScript, utexas.edu (Year: 2009).

Han et al., Lightweight Resource Scaling for Cloud Applications, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR,va123, 2014.

http://www.codechef.com/ide web page from date Apr. 5, 2015, retrieved using the WayBackMachine, from https://web.archive.org/web/20150405045518/http://www.codechef.com/ide, 2015.

Kamga et al., Extended scheduler for efficient frequency scaling in virtualized systems, Jul. 2012, 8 pages.

Kazempour et al., AASH: an asymmetry-aware scheduler for hypervisors, Jul. 2010, 12 pages.

Kraft et al., 10 performance prediction in consolidated virtualized environments, Mar. 2011, 12 pages.

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.

Lagar-Cavilla, H. Andres, et al. "Snowflock: Virtual machine cloning as a first-class cloud primitive." ACM Transactions on Computer Systems (TOCS) 29.1 (2011): 1-45. (Year: 2011).

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

(56) References Cited

OTHER PUBLICATIONS

Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Tange, "GNU Parallel: The Command-Line Power Tool", vol. 26, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the Internet: URL<https://ieeexplore.ieee.org/stamp/stamp.jsp?tp=arnumber=7097814, 8 pages.
Wikipedia "API" pages from date Apr. 7, 2015, retrieved using the WayBackMachine from https://web.archive.org/web/20150407191158/https://en .wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
International Search Report for Application No. PCT/US2019/038520 dated Aug. 14, 2019.
Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).

* cited by examiner

OPERATING SYSTEM CUSTOMIZATION IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
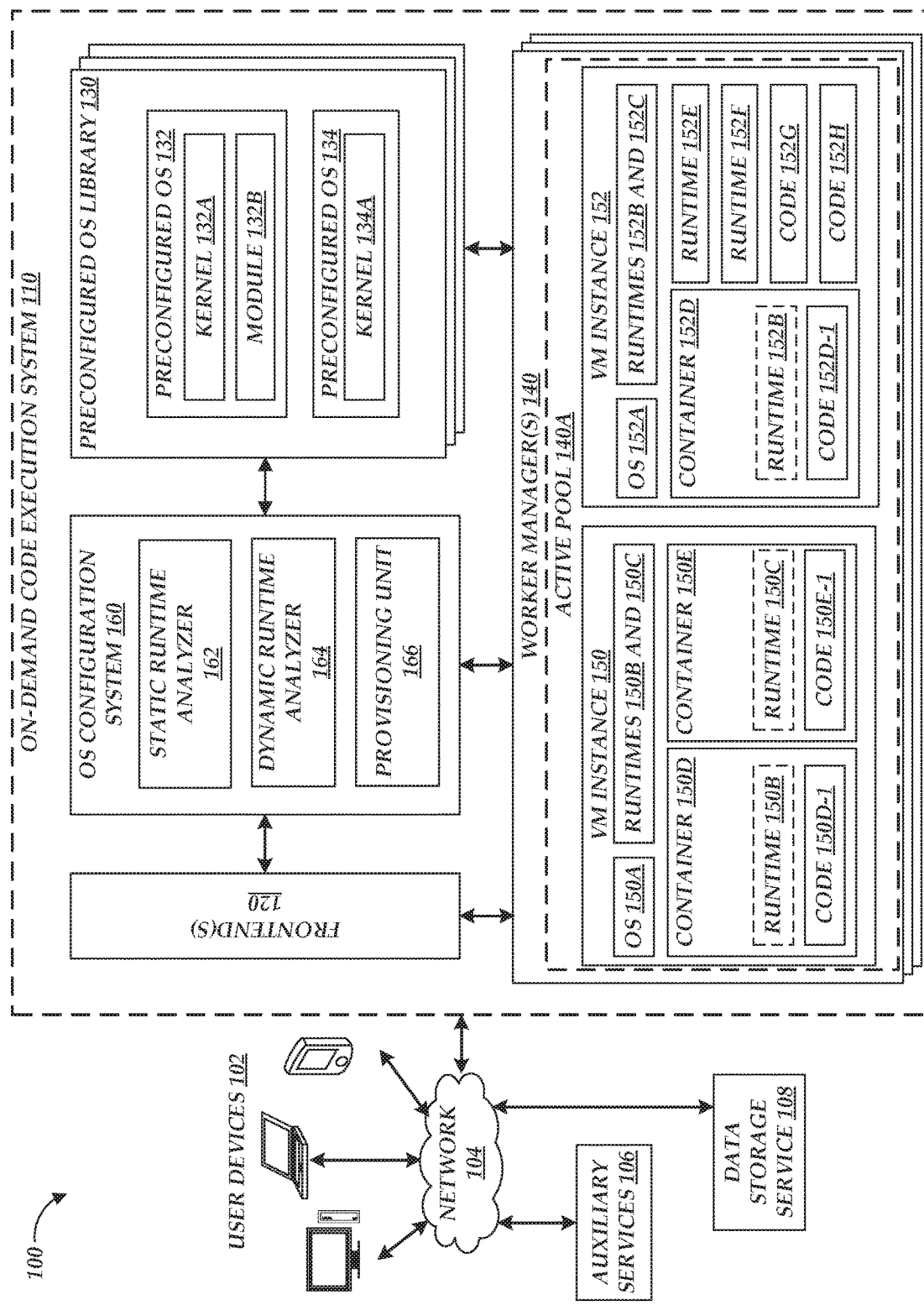
FIG. 1 is a block diagram depicting an illustrative environment in which an on-demand code execution system can operate to execute tasks corresponding to code, which may be submitted by users of the on-demand code execution system, and to enable customization of virtual machine operating systems to facilitate execution of the submitted code.

Generally described, aspects of the present disclosure relate to an on-demand code execution system. The on-demand code execution system enables rapid execution of code, which may be supplied by users of the on-demand code execution system. More specifically, embodiments of the present disclosure relate to customizing virtual machine operating systems to facilitate rapid execution of code in the on-demand code execution system. As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may instantiate virtual machine instances to execute the specified tasks on demand. The virtual machine instances may be provisioned with operating systems, which provide functionality that the user-specified executable code may require during execution. For example, an operating system may provide functions such as task scheduling, filesystem management, memory management, caching, profiling, networking, hardware device drivers, and the like. In some instances, the time required to instantiate a virtual machine instance and provision it with an operating system may be significant relative to the overall time required to execute the task.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the limited nature of computing resources with which to execute code, the resource overhead associated with provisioning virtual machines with operating systems to facilitate code execution, and the inefficiencies caused by provisioning functionality that is not utilized. These technical problems are addressed by the various technical solutions described herein, including the provisioning of an execution environment with a customized operating system based on the functionality required by the code to be executed. Thus, the present disclosure represents an improvement on existing data processing systems and computing systems in general.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as an dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof.

As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more preconfigured OS libraries 130, which in turn include one or more preconfigured operating system variants. In the example illustrated in FIG. 1, the preconfigured OS library 130 includes a preconfigured OS 132, which comprises a kernel 132A and a module 132B, and a preconfigured OS 134, which comprises a kernel 134A. In some embodiments, as described in more detail below, the kernel 132A and the kernel 134A may be the same, and the difference between the preconfigured OS 132 and the preconfigured OS 134 may be the presence or absence of the module 132B. In other embodiments, the different preconfigured OSes 132 and 134 may have different kernels 132A and 134A. For example, the kernel 134A may contain a subset of the operating system functions implemented by the kernel 132A, or the kernels 132A and 134A may each provide distinct functionality. In other embodiments, the preconfigured OS libraries 130 may contain kernel modules or other "building blocks" for assembling an operating system, rather than containing a library of preconfigured OSes. Preconfigured OS 132 and preconfigured OS 134 may, in some embodiments, be variants of the same operating system, and may differ in terms of the functionality that is incorporated into the kernels 132A and 134A at the operating system level ("kernel-space functionality"), as opposed to functionality that is provided or incorporated at the user level such as applications, runtimes, user preferences, non-native libraries, and the like.

The preconfigured OS libraries 130 support rapid provisioning and configuration of virtual machine instances, such as the virtual machine instances 150 and 152. In one embodiments, the preconfigured OSes in a particular library 130 may be preconfigured in the same or substantially similar manner. For example, the preconfigured OSes may be variants of a particular operating system with particular kernel subsystems or modules included or excluded, particular OS libraries included or excluded, particular device drivers included or excluded, and so forth. As another example, the preconfigured OSes in a particular library 130 may all omit a particular set of operating system functions, such as filesystem APIs or networking APIs. In some embodiments, each preconfigured OS library 130 may be associated with a particular worker manager 140, which may manage resources that correspond to the library 130's preconfigured OSes. For example, a particular worker manager 140 may be provisioned without access to storage media, and may be associated with a preconfigured OS library 130 of operating systems that do not provide filesystem functions.

The on-demand code execution system 110 further includes an OS configuration system 160, which implements aspects of the present disclosure including, for example, the generation or selection of a customized OS variant for a particular task. In some embodiments, the OS configuration system 160 includes a static runtime analyzer 162, which may be invoked when the user submits code via the frontend 120 to determine an OS variant to use with the submitted code. As described in more detail below, the static runtime analyzer 162 may analyze the user's code and identify, for example, API calls, operating system calls, function calls, or other indications of OS functionality that the code will require during execution. In various embodiments, the static runtime analyzer 162 may analyze keywords, symbols, headers, directives, or other aspects of the user's code. In further embodiments, the on-demand code execution system 110 includes a dynamic runtime analyzer 164, which may be invoked when the user's code it executed to analyze the OS functionality that is actually utilized during execution of the code. The dynamic runtime analyzer 164 may identify, for example, a portion of the source code that requires specific OS functionality, but is seldom or never reached during execution. For example, the user's code may write to a log file if it encounters a particular error condition, but the error may be relatively infrequent (e.g., the user's code may frequently run to completion without encountering the error condition) and the code may otherwise not perform any filesystem reads or writes.

In accordance with aspects of the present disclosure, the OS configuration system 160 further includes a provisioning unit 166 configured to provision a customized OS with the functionality identified by the static runtime analyzer 162, the dynamic runtime analyzer 164, or both. Specifically, and as discussed in more detail below, the provisioning unit 166 may provision a preconfigured OS from the preconfigured OS library 130, or may generate instructions or other configuration information for selecting, generating, or provisioning an OS. The configuration information may be stored (e.g., in the data storage service 108) for later use by the worker manager 140 when a subsequent code execution is requested. The provisioning unit 166 can accordingly operate to improve operation of the system 110 as a whole during provisioning of virtual machine instances by removing unused code from the operating system and reducing the overhead requirements of the instances.

The on-demand code execution system further includes one or more worker managers 140 that manage the instances used for servicing incoming calls to execute tasks. In the example illustrated in FIG. 1, each worker manager 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art. In accordance with embodiments of the present disclosure, the worker manager 140 can obtain an OS configuration and/or a preconfigured OS when provisioning a virtual machine instance.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 150 and 152. The instance 150 has a preconfigured OS 150A, runtimes 150B and 150C, and containers 150D and 150E. The container 150D includes a copy of the runtime 150B, and a copy of a code 150D-1. The container 150E includes a copy of the runtime 150C, and a copy of a code 150E-1. The instance 152 has a preconfigured OS 152A, runtimes 152B, 152C, 152E, and 152F, a container 152D, and codes 152G and 152H. The container 152D has a copy of the runtime 152B and a copy of a code 152D-1. As illustrated in FIG. 1, instances may have user codes loaded thereon, and containers within those instances may also have user codes loaded therein. In some embodiments, the runtimes may also be user provided. Illustrative examples for utilization of user-provided runtimes on the on-demand code execution system are described in U.S. patent application Ser. No. 15/841,132, entitled "MANAGING CUSTOM RUNTIMES IN AN ON-DEMAND CODE EXECUTION SYSTEM," and filed Dec. 13, 2017 (the "'132 application"), the entirety of which is hereby incorporated by reference. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool (e.g., including the number and type of instances). In other embodiments, the worker managers 140 requests compute capacity from a warming pool manager without having knowledge of the virtual machine instances in a warming pool.

In the example illustrated in FIG. 1, tasks are executed in isolated execution environments referred to as containers (e.g., containers 150D, 150E, 152D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task.

While some functionalities are generally described herein with reference to an individual component of the on-demand code execution system 110, other components or a combination of components may additionally or alternatively implement such functionalities. For example, a worker manager 140 may operate to select preconfigured OSes or generate OSes in a manner similar or identical to as described herein with reference to an OS configuration system 160.

Figure 2:
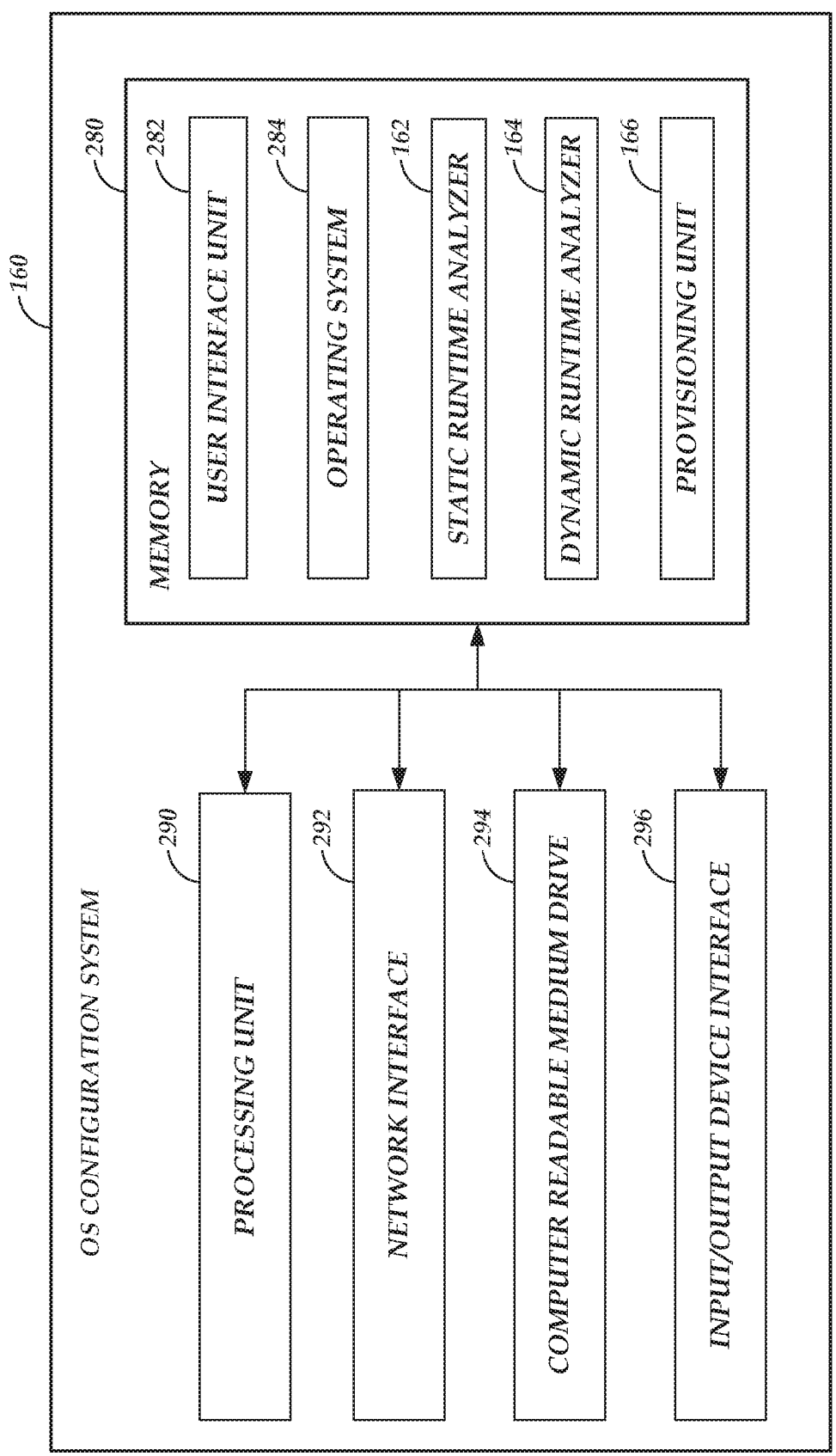
FIG. 2 depicts a general architecture of a computing device providing a OS customization system that is configured to facilitate customization of OSes used to facilitate execution of tasks on the on-demand code execution system of FIG. 1.

FIG. 2 depicts a general architecture of a computing system (referenced as OS configuration system 160) that operates to determine OS variants within the on-demand code execution system 110. The general architecture of the OS configuration system 160 depicted in FIG. 2 includes an arrangement of computer hardware and software modules that may be used to implement aspects of the present disclosure. The hardware modules may be implemented with physical electronic devices, as discussed in greater detail below. The OS configuration system 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the OS configuration system 160 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the OS configuration system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a static runtime analyzer 162, a dynamic runtime analyzer 164, and a provisioning unit 166 that may be executed by the processing unit 290. In one embodiment, the static runtime analyzer 162, dynamic runtime analyzer 164, and provisioning unit 166 individually or collectively implement various aspects of the present disclosure, e.g., generating or selecting customized operating system variants within the on-demand code execution system 110, analyzing code or code execution to determine required OS functionality, etc., as described further below.

While the static runtime analyzer 162, dynamic runtime analyzer 164, and provisioning unit 166 are shown in FIG. 2 as part of the OS configuration system 160, in other embodiments, all or a portion of the static runtime analyzer 162, dynamic runtime analyzer 164, and provisioning unit 166 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the OS configuration system 160.

In some embodiments, the OS configuration system 160 may further include components other than those illustrated in FIG. 2. For example, the memory 280 may further include an instance allocation unit for allocating execution environments to tasks, user code execution unit to facilitate execution of tasks within the execution environments, or a container manager for managing creation, preparation, and configuration of containers within virtual machine instances.

Figure 3:
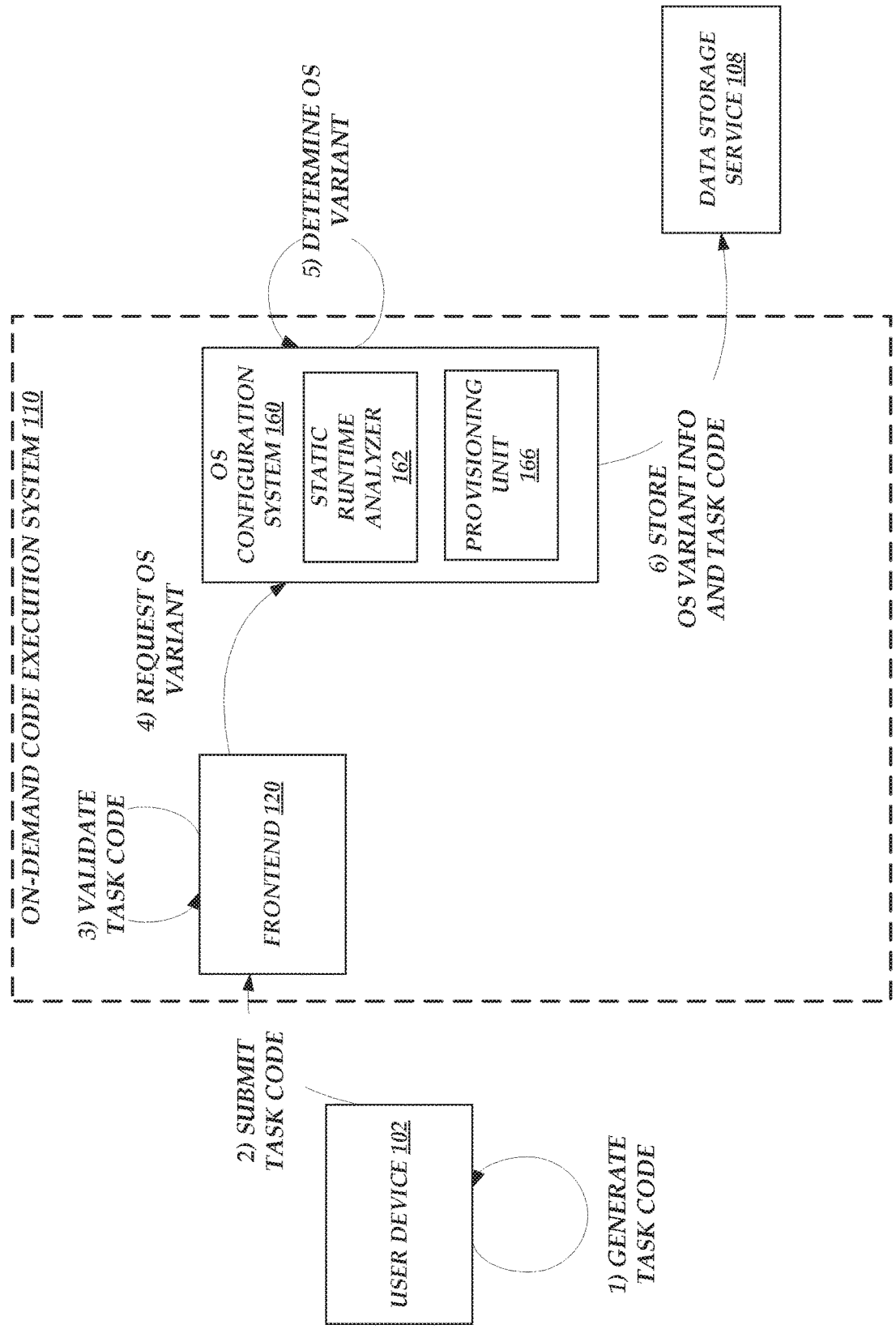
FIG. 3 is a flow diagram depicting illustrative interactions for submitting code corresponding to a task to the on-demand code execution system of FIG. 1, and for the on-demand code execution system to provide a customized operating system to facilitate execution of the task on the on-demand code execution system.

With reference to FIG. 3, illustrative interactions are depicted for determination of OS variants. The interactions of FIG. 3 begin at (1), where a user device 102 may generate task code for execution on an on-demand code execution system 110. Illustratively, the user may generate code that makes various system calls, and thus requires an operating system that provides corresponding functionality. At (2), the user device 102 submits the task code to the frontend 120, such as by using a API or other interface of the frontend 120, and at (3) the frontend 120 validates the submitted task code. Validation can include, for example, verifying that the task code can be executed by the on-demand code execution system 110.

At (4), the frontend 120 transmits a request to the OS configuration system 160 to generate or select an OS variant for the task. The OS configuration system 160, in turn, analyzes the task code at (5) to determine a suitable OS variant. Illustratively, the static runtime analyzer 162 of the OS configuration system may identify a programming language or languages in which the task code is written, such as Perl, Ruby, Python, JavaScript, Java, or the like. The static runtime analyzer 162 may further identify language keywords associated with operating system functions. For example, the static runtime analyzer 162 may determine that a task written in Java imports the java.io.file package, and thus may require an OS that includes filesystem functionality. The static runtime analyzer 162 may further analyze the task code to identify specific keywords or operations associated with particular functionality. For example, the static runtime analyzer 162 may determine that the task code requires an OS that facilitates reading UDP datagrams from a networked data stream, but does not require that the OS facilitate writing to the data stream, buffering the data stream, network protocols other than UDP, or other networking functionality.

In some embodiments, the OS configuration system 160 may determine an OS variant for the task by selecting a preconfigured OS from a library, such as the preconfigured OS library 130 of FIG. 1. For example, the OS configuration system 160 may identify OS functionality that the task code requires, and may identify one or more preconfigured OSes that provide this functionality. In some embodiments, the OS configuration system 160 may select an OS variant from among a number of preconfigured OSes that provide the required functionality based on criteria such as resource requirements, load times, response times, or other criteria that compare or rank the eligible OSes. In further embodiments, the preconfigured OS library 130 may store rankings or ratings with the preconfigured OSes, and the OS configuration system 160 may select a preconfigured OS that provides the needed functionality based on the rankings or ratings.

As an example, the OS configuration system 160 may determine that the task code for a particular task can execute to completion without exhausting the physical memory that is allocated to a virtual machine instance. Accordingly, the OS configuration system 160 can determine that the virtual machine instance's OS variant does not need to implement memory management functions such as swapping, paging, address translation, and so forth, since these functions will not be needed within the lifecycle of the virtual machine instance. The OS configuration system 160 may thus obtain a preconfigured OS variant that does not implement these functions, and that does implement functions required by the task code (e.g., functions relating to threading and interprocess communication).

In some embodiments, the OS configuration system 160 may generate an OS variant that provides the specific functionality required by the task. For example, the OS configuration system may identify a set of loadable kernel modules, userspace processes, or other components that provide the required functionality, and may generate an OS variant that includes those specific components. In some embodiments, the OS configuration system 160 may implement or utilize a microkernel architecture to generate custom OS variants. In other embodiments, the OS configuration system 160 may utilize a library of preconfigured OS variants with differing monolithic kernels as described above.

At (6), the OS configuration system 160 may store information identifying the determined OS variant, and in some embodiments the validated task code, in a storage device such as the data storage device 108. The on-demand code execution system 110 may thus reduce the time spent analyzing code and determining OS variants when receiving a request to execute the task code, as discussed in more detail below.

In some embodiments, the ordering and implementation of operations described above may be modified, or these interactions may be carried out by additional or alternative elements of the on-demand code execution system 110. For example, in one embodiment, the frontend 120 may enable user selection of a preconfigured OS from the library 130 (or from a subset of available OSes in the library 130), and the OS configuration system 160 may analyze the task code to identify and report any issues that would prevent the task code from executing with the user-selected OS variant. As a further example, in another embodiment, the OS configuration system 160 may identify an OS variant from among a set of OS variants that are currently in use in the active pool 140A of FIG. 1. Still further, in another embodiment, worker managers 140 may be categorized according to the OS variant(s) that they execute, and the OS configuration system 160 may select an OS variant by designating the worker manager(s) 140 upon which the task code may be executed.

Figure 4:
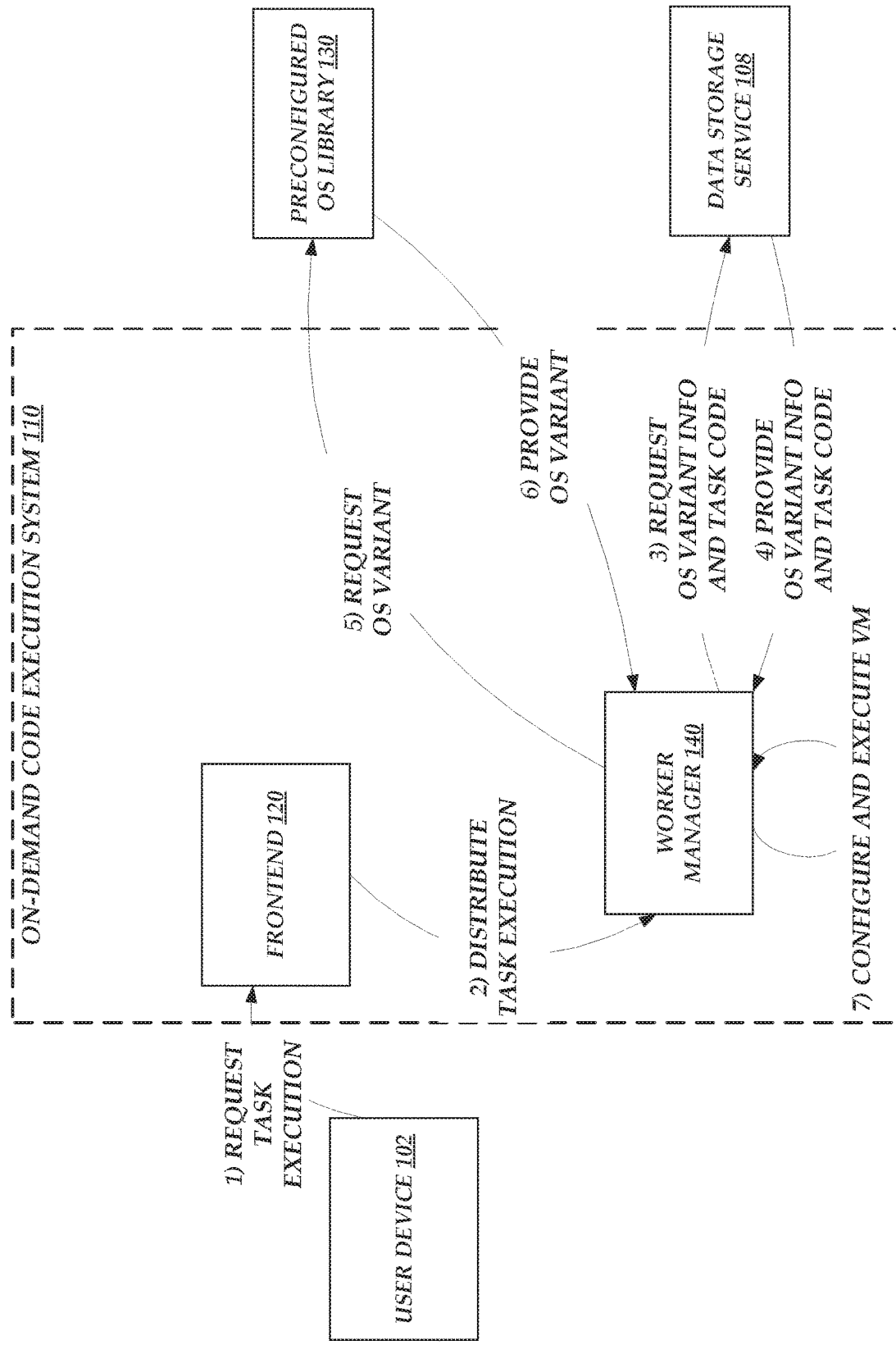
FIG. 4 is a flow diagram depicting illustrative interactions for executing a task utilizing the customized operating system provided on the on-demand code execution system of FIG. 1.

Illustrative interactions for utilizing the determined OS variant to execute tasks on the on-demand code execution system 110 will be described with reference to FIG. 4. At (1), the user device 102 may request task execution. In some embodiments, as described above, the frontend 120 may initiate task execution without receiving a request, in which case the interaction at (1) may be omitted.

At (2), the frontend 120 distributes the task for execution to the worker manager 140. Prior to distributing the task execution, the frontend 120 may undertake any of a number of additional interactions, such as queuing the request, validating the request, etc., as described in more detail within the '556 patent, incorporated by reference above.

At (3), the worker manager 140 requests information identifying an OS variant for the task. In some embodiments, as described above, an OS variant may be determined when the code of the task is submitted for validation (e.g., by carrying out the interactions illustrated in FIG. 3). In other embodiments, as described below with reference to FIG. 5, the OS variant may be determined or updated based on an analysis or analyses of previous executions of the task. At (4), the worker manager 140 receives information identifying the previously determined OS variant from the data storage device 108. In some embodiments, the worker manager 140 may also request and receive the user-submitted code associated with the task. In other embodiments, the worker manager 140 may receive the user-submitted code from the frontend 120 when the task is distributed for execution.

Thereafter, at (5), the worker manager 140 requests a preconfigured OS from the preconfigured OS library 130 that corresponds to the determined OS variant. In some embodiments, as described above, the worker manager 140 may instead identify a virtual machine instance in its active pool that has the desired OS variant. In other embodiments, the worker manager 140 may request the generation of a customized OS, or may generate a customized OS by assembling components or modules. At (6), the worker manager 140 receives the requested OS. In some embodiments, the worker manager 140 may determine that it does not have sufficient resources to provision a virtual machine with the identified OS variant, or may determine at an earlier stage (e.g., prior to the interaction at (3)) that it does not have sufficient resources to execute the task regardless of the OS variant. For example, the worker manager 140 may manage a pool of resources that does not include data storage, and the identified OS variant may be one that provides filesystem functionality. In such embodiments, the worker manager 140 may request that the provisioning unit 166 of FIG. 1 (or another component of the on-demand code execution system 110) select an alternate worker manager 140 to execute the task. In other embodiments, the worker manager 140 may request that the provisioning unit 166 select an alternate worker manager 140 to execute the task whenever the worker manager 140 does not have a pre-instantiated virtual machine executing the identified OS variant. Such a configuration may, for example, reduce or eliminate the need for interactions (5) and (6), as many or all executions would be expected to be serviced by a worker manager 140 with a pre-instantiated virtual machine executing the identified OS variant. In still more embodiments, the generation of a virtual machine executing an OS variant on a worker manager 140 may be handled by the provisioning unit 166. Thus, for example, if the worker manager 140 determines that a pre-instantiated virtual machine executing the identified OS variant is not available to the worker manager 140, the worker manager 140 may request that the provisioning unit 166 generate such a virtual machine on a host device under control of the worker manager 140.

At (7), the worker manager 140 configures (and, in some embodiments, provisions) a virtual machine instance with the OS variant and the task code, and then executes the task. Execution of the task may include, for example, locating and provisioning an execution environment, which is discussed in more detail within the '556 patent incorporated by reference.

In some embodiments, the ordering and implementation of operations described above may be modified, or these interactions may be carried out by additional or alternative elements of the on-demand code execution system. For example, in one embodiment, the frontend 120 may be configured to request an OS variant in accordance with interactions (3) and (4), above. These interactions may occur, for example, prior to a task execution being distributed to the worker manager 140. The worker manager 140 may then receive distribution of a task execution and an associated OS variant, and instruct the execution environment to execute the task. The environment, based on such instructions, may then implement interactions (4) and (5) to obtain a preconfigured OS from the library 130. Thereafter, the execution environment may execute code of the task, thus fulfilling the execution instructions of the frontend 120. Illustrative mechanisms for an environment to identify and retrieve code objects in order to execute a task are described in more detail within the '132 application, incorporated by reference above.

Figure 5:
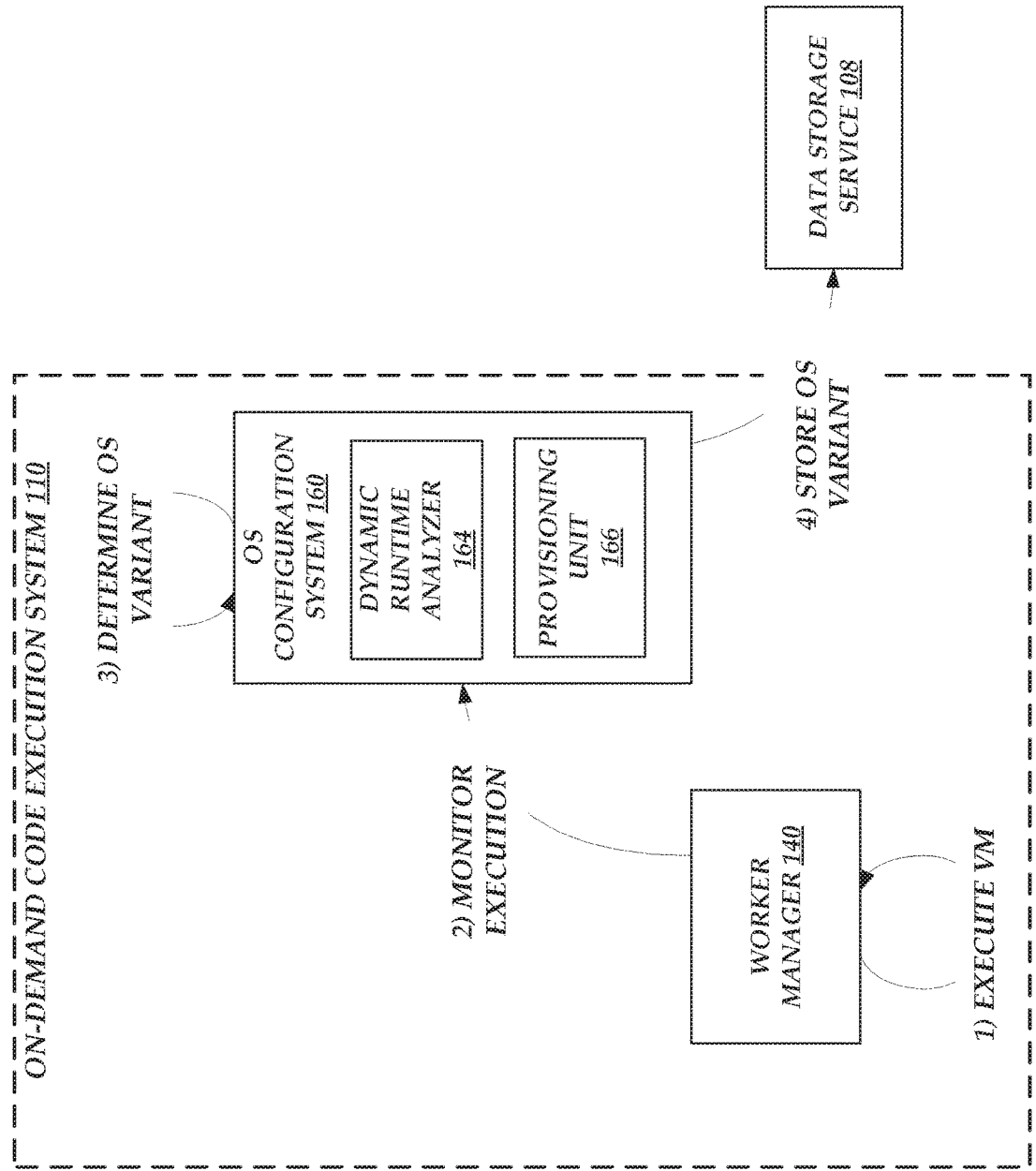
FIG. 5 is a flow diagram depicting illustrative interactions for modifying customized operating systems on the on-demand code execution system of FIG. 1 based on analysis of an executing task on the on-demand code execution system of FIG. 1.

FIG. 5 depicts illustrative interactions for determining an OS variant based on an execution or executions of the task code. At (1), the worker manager 140 executes a task within a virtual machine instance. In some embodiments, the task may be executed on a virtual machine instance with an unconfigured OS, such as a standard or default OS. In other embodiments, the task may be executed on a virtual machine instance with an OS variant determined at the time the code was submitted (e.g., as described above with reference to FIG. 3), or with an OS variant that was previously determined by carrying out the interactions depicted in FIG. 5.

At (2), the OS configuration system 160 may monitor execution of the task within the virtual machine instance. Illustratively, the dynamic runtime analyzer 164 of the OS configuration system 160 may identify system calls made during execution of the task to determine the OS functionality that the task requires. For example, the dynamic runtime analyzer 164 may determine that execution(s) of the task have invoked OS functions relating to certain hardware device drivers, threading and process scheduling, and memory management, but not OS functions relating to networking or filesystems. Thereafter, at (3), the OS configuration system 160 may determine an OS variant. As described above, the OS configuration system 160 may determine an OS variant that minimizes the resource footprint of the OS while providing the functionality needed to execute the task.

In some embodiments, the OS configuration system 160 may determine a probability that the task will require a particular OS function or set of functions. For example, the OS configuration system 160 may monitor multiple executions of a particular task and determine that the task typically does not require networking functionality, but on rare occasions will require it. The OS configuration system 160 may thus perform a cost-benefit analysis to assess whether it is more efficient to execute the task with or without providing the functionality in the OS. For example, a resource cost (e.g., load time, memory footprint, latency, etc.) associated with providing the functionality may be determined. This resource cost may be compared to a resource cost associated with not providing the functionality, as well as a resource cost associated with recovering from a situation in which the functionality was needed but not provided. For example, the OS configuration system 160 may determine a cost associated with reloading and re-executing all or part of the task on a second virtual machine instance configured with an OS that provides the functionality. In some embodiments, state information, partial results, or other information may be transferred from one virtual machine instance to another in order to expedite recovery from a situation in which OS functionality was needed and not provided. In further embodiments, the OS configuration system 160 may determine an OS variant that does not provide the identified functionality and a "fallback" OS variant that does, and may store instructions for expediting recovery in the event the missing functionality is required. In still further embodiments, the OS configuration system 160 may determine that it would be faster (or otherwise more efficient) to re-execute the entire task on a virtual machine instance configured with a default, fully-featured OS than to attempt to salvage all or part of the attempt to execute the task on the virtual machine instance with the customized OS variant.

At (4), the OS configuration system 160 stores the determined OS variant(s) in a data store, such as the data storage service 108. In some embodiments, the OS configuration system 160 may determine whether a dynamic analysis of the task's OS requirements (e.g., an analysis performed on the executing task) is consistent with a previously performed static analysis (e.g., an analysis performed on the submitted task code), and may update its parameters for static analysis accordingly. For example, the OS configuration system 160 may determine a relationship between a particular element of the task code (e.g., a directive to import a particular module) and requiring certain OS functions, and may take this relationship into account when performing further static analyses. In some embodiments, the OS configuration system 160 may store a "recipe" or other instructions for building an OS variant from modules or other components. In other embodiments, the OS configuration system 160 may store information that identifies a preconfigured OS, information regarding the OS functionality required by the task code, or other information that enables the worker manager 140 to provision and configure a virtual machine instance with an OS that is customized for the task code the instance will execute.

Figure 6:
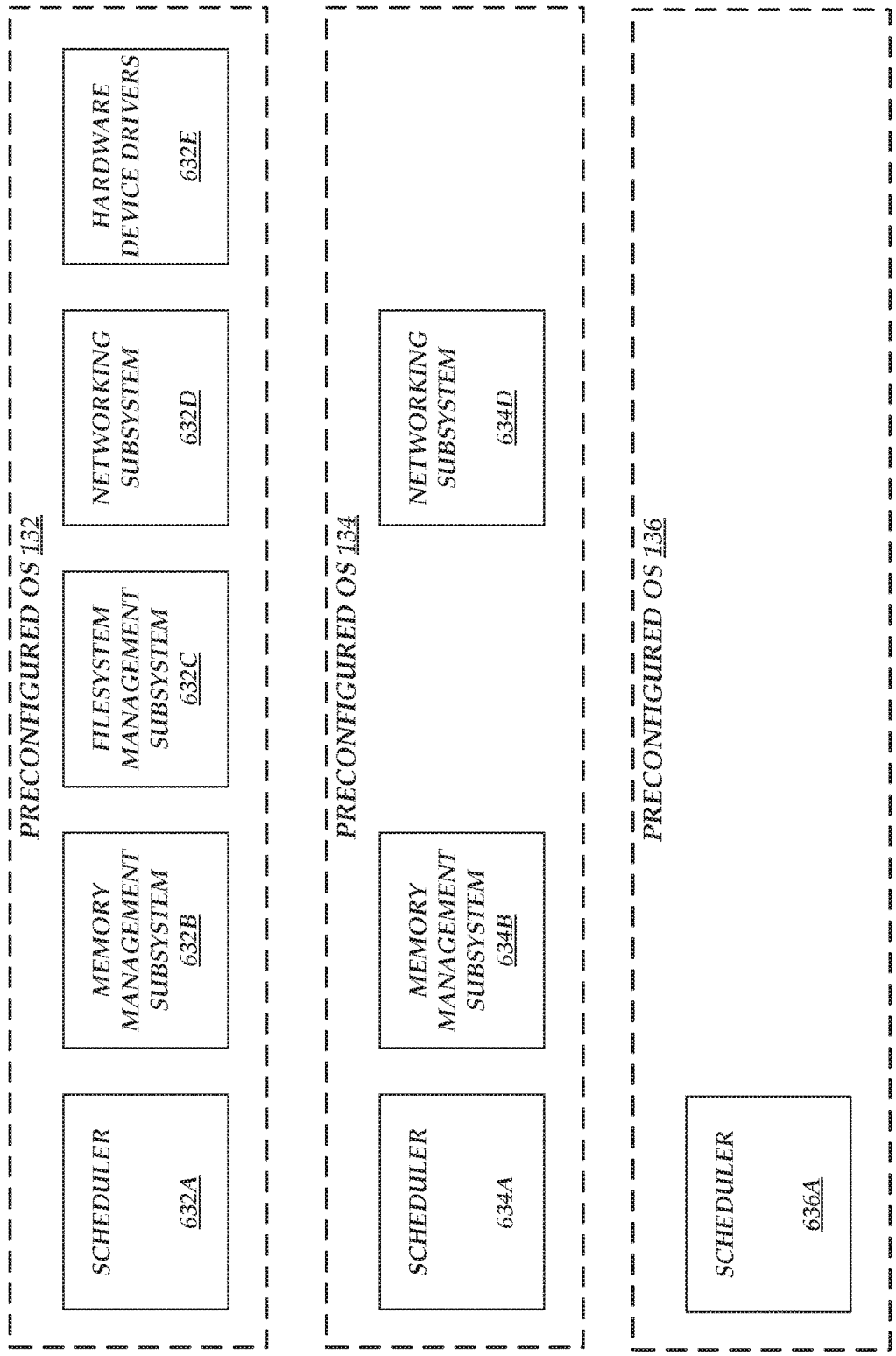
FIG. 6 is an illustrative visualization of customized operating systems that may be generated or selected to facilitate execution of tasks on the on-demand code execution system of FIG. 1.

An illustrative visualization of preconfigured operating systems is shown in FIG. 6. The illustrative visualization includes preconfigured OSes 132, 134, and 136, in which various functions that are provided by operating systems are represented as functional blocks or modules. In various embodiments, these blocks may represent modules or elements of an OS kernel, userspace processes or subsystems, libraries, drivers, or other elements of an operating system that can be functionally separated from each other.

In the visualization shown in FIG. 6, the preconfigured OS 132 is a "full" operating system that includes a full set OS functionality. The preconfigured OS 132 may correspond, for example, to a generally available OS (e.g., a standard Linux distro). In some embodiments, the preconfigured OS 132 may correspond to a custom OS that implements all of the functionality supported by an on-demand code execution system, but not all of the functionality supported by operating systems generally. For example, an on-demand code execution system may support only a simplified filesystem (e.g., a "flat" filesystem without directories), and so the preconfigured OS 132 may implement only a subset of filesystem-related system calls. In the illustrated embodiment, the preconfigured OS 132 includes a scheduler 632A, a memory management subsystem 632B, a filesystem management subsystem 632C, a networking subsystem 632D, and hardware device drivers 632E. One skilled in the art will appreciate that the list of components 632A-E is provided for purposes of example, and that the present disclosure includes embodiments in which operating systems have more, fewer, or different components than the ones depicted in FIG. 6. For example, the preconfigured OS 132 may include distinct modules for reading to filesystems and writing to filesystems, or different networking subsystems for different network protocols (e.g., a TCP/IP networking module and a UDP networking module).

The preconfigured OS 134 is a variant that implements a subset of the functionality provided by the preconfigured OS 132, including a scheduler 634A, a memory management subsystem 634B, and a networking subsystem 634D. The preconfigured OS 134 does not include functionality relating to filesystem management or hardware device drivers, and may thus be suitable only for tasks that do not require these functions. In some embodiments, the scheduler 634A may provide the same functionality as (or may be identical to) the scheduler 632A, or may provide different functionality. The preconfigured OS 136 further illustrates a minimal OS variant that provides only a scheduler 636A, and does not include any of the other functionality depicted in FIG. 6. In an embodiment, a preconfigured OS library, such as the preconfigured OS library 130 of FIG. 1, may include dozens or hundreds of other variations on preconfigured OSes 132, 134, and 136, including variations in which a scheduler is not provided. In another embodiment, all of the preconfigured OSes in a library may implement certain "core" OS functions such as task scheduling, and may vary in terms of other functions. In further embodiments, preconfigured OSes may vary in terms of the functionality implemented within one of the subsystems or modules depicted in FIG. 6. For example, a preconfigured OS may have more, fewer, or different hardware device drivers than another preconfigured OS, or may implement read-only networking.

In some embodiments, as described above, the OS configuration system 160 of FIG. 1 (or another component of the on-demand code execution system 110) may build an OS variant from individual modules or elements rather than selecting a preconfigured OS such as OS 134. For example, the OS configuration system 160 may determine that a particular task requires OS functions including task scheduling, memory management, and networking, and may thus assemble an OS out of individual components such as scheduler 632A, memory management subsystem 632B, networking subsystem 632D, and other such components. In further embodiments, the OS configuration system 160 may start with a base OS that includes minimal functionality and then add specific functions that the task may require. In other embodiments, the OS configuration system 160 may start with a fully-featured OS and remove functionality that the task may not require.

Figure 7:
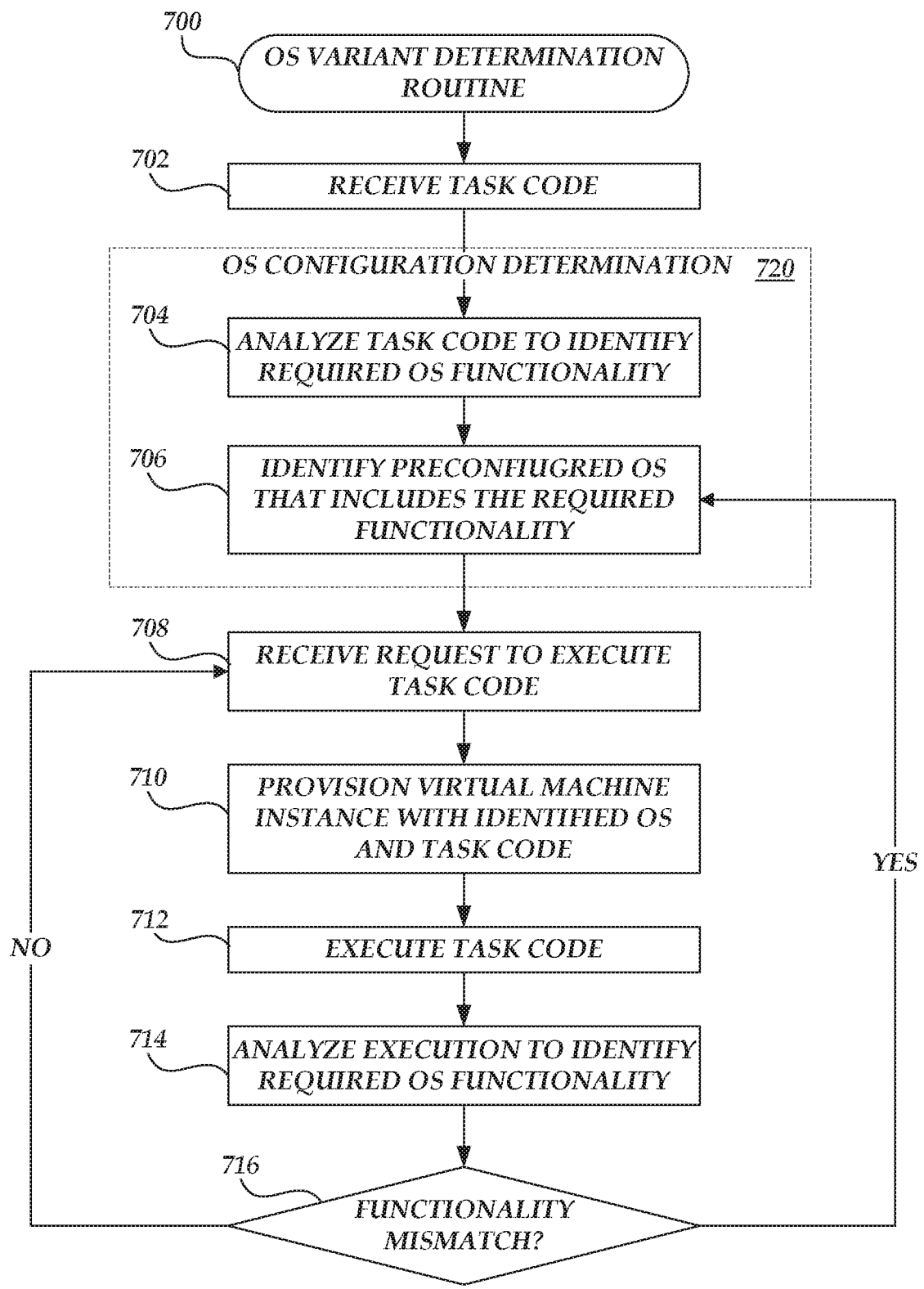
FIG. 7 is a flow chart depicting an illustrative routine for determining an OS configuration to facilitate execution of tasks on the on-demand code execution system of FIG. 1.

With reference to FIG. 7, one illustrative routine 700 for determining an OS variant for executing a task on the on-demand code execution system 110 will be described. The routine 700 may be carried out, for example, by the OS configuration system 160 of FIG. 1. In one embodiment, all or part of the routine 700 (e.g., blocks 702-706) is carried out in conjunction with the creation of a task on the on-demand code execution system 110. In another embodiment, all or part of the routine 700 (e.g., blocks 706-716) may be carried out in conjunction with executing the task on the on-demand code execution system 110. All or part of the routine 700 may additionally or alternatively be carried out at other times, such as periodically (e.g., once per day, week, month, etc.) or based on detection that execution metrics or resource utilization metrics fall outside a threshold.

The routine 700 begins at block 702, where the OS configuration system 160 obtains code for a task (e.g., as submitted by a user). In one embodiment, the code for the task is represented as a code object, such as a compressed file including source code for the task. The routine 700 then continues to blocks 704 and 706, where the OS configuration system 160 determines an OS variant for the task, shown in FIG. 7 as block collection 720.

At block 704, the OS configuration system 160 analyzes the obtained task code to identify OS functionality that may be required during code execution. Illustratively, the OS configuration system 160 may identify system calls, API calls, libraries, programming language features, or other indications that particular OS functionality may be required, as described in more detail above. In some embodiments, the OS configuration system 160 may compare the obtained task code to other task code executed by the on-demand code execution system 110, and may identify similarities or common features that identify required OS functionality. In other embodiments, the OS configuration system 160 may identify previous executions of the obtained task code and determine the OS functionality required during those executions. In various embodiments, the OS functionality may be identified as a particular set of functionality (e.g., networking functionality), as particular APIs or subsystems, or as individual functions or system calls.

At block 706, the OS configuration system 160 identifies a preconfigured OS that includes the functionality identified at block 704. In some embodiments, as described above, the OS configuration system 160 may identify multiple preconfigured OSes that include the identified functionality, and may apply various criteria (load times, execution speed, ratings or rankings of preconfigured OSes, etc.) to determine which of the preconfigured OSes to select. In other embodiments, the OS configuration system 160 may generate or assemble an OS with the required functionality, as described in more detail above. In some embodiments, the OS configuration system 160 may store the identified OS configuration and the task code in a data store for later use, and the portion of routine 700 after block 706 may be invoked as a separate routine when the task code is executed.

At block 708, the frontend 120 (or another element of the on-demand code execution system 110) receives a request to execute the task code. In one embodiment, the on-demand code execution system 110 may execute the task code without a request. For example, the on-demand code execution system 110 may execute the task code periodically, as described above, or may execute the task code when certain criteria are satisfied.

At block 710, the worker manager 140 or another component provisions a virtual machine instance with the identified preconfigured OS and the task code. In various embodiments, the worker manager 140 may select an existing virtual machine instance that is already provisioned with the preconfigured OS (including, for example, a virtual machine instance in a warming pool or other standby mode, as described in the '556 patent that is incorporated by reference above), build a custom OS from components, or otherwise provision the virtual machine with an OS variant that provides the functionality that the task code may require. In other embodiments, worker managers 140 may be associated with particular OS variant or variants, and the frontend 120 or another component may select a particular worker manager 140 based on the OS variant(s) supported by that worker manager 140.

At block 712, the worker manager 140 executes the task code. At block 714, the OS configuration system 160 may analyze the execution of the task code to identify OS functionality required during the execution. The OS configuration system 160 may analyze, for example, log files, network activity, filesystem activity, or other information generated or collected during execution of the task code. The analysis at block 714 is similar in purpose to the analysis carried out at block 704, but analyzes the functionality that is actually invoked during execution rather than analyzing the code to determine what functionality it may invoke. The analysis at block 714 may therefore identify portions of the task code that require specific OS functionality, but are seldom or never invoked during execution. For example, a subroutine in the code may require that the OS provide a particular device driver, but the code may not reach the subroutine during the execution at block 712. In some embodiments, the OS configuration system 160 may analyze several executions of the task code, as described above, to determine a probability that particular OS functions will be required during execution.

At decision block 716, the OS configuration system 160 may determine whether there is a mismatch between the functionality required by the task code and the functionality provided by the identified OS variant. It will be understood that the mismatch may be in either direction. For example, the OS configuration system 160 may determine that the identified OS variant provides more functionality than is needed to execute the task, and thus further efficiency gains may be realized by identifying a different OS variant. Alternatively, the OS configuration system 160 may determine that the identified OS variant does not provide all of the required functionality. For example, the OS configuration system 160 may determine that the worker manager 140 had to restart execution of the task code with a different OS variant than the one initially identified. In some embodiments, an OS variant may generate a "kernel panic" or other indication that required functionality is missing in order to cause the worker manager 140 to correct this situation. If the determination at decision block 716 is that a different OS variant is needed, then the routine 700 branches to block 706 and identifies the new OS variant. If not, the routine 700 branches to block 708 and awaits the next request to execute the task code, which will be fulfilled with the current OS variant.

The blocks of the routines described above may vary in embodiments of the present disclosure. For example, in some implementations of either routine, the OS configuration system 160 may be configured to implement additional functionality, such as generating and storing additional OS variants. Thus, the routines may include additional blocks, or the blocks of the routines may be rearranged, according to various embodiments.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a physical data store storing a plurality of variants of an operating system ("OS") kernel, wherein individual variants of the plurality of variants provide different subsets of a set of OS functions provided by the OS kernel; and
a computing device configured with executable instructions to:
receive user-submitted code executable on an on-demand code execution system;
determine a first set of OS functions that the user-submitted code is expected to invoke when executed on the on-demand code execution system;
identify, based at least in part on the first set of OS functions that the user-submitted code is expected to invoke when executed, a first variant of the plurality of variants of the OS kernel to be used to support invocation of the first set of OS functions during execution of the user-submitted code, wherein the first variant provides at least the first set of OS functions; and
in response to a request to execute the user-submitted code:
provision a virtual machine instance with the first variant of the OS kernel and the user-submitted code.

2. The system of claim 1, wherein the computing device is further configured to identify one or more system calls in the user-submitted code, and wherein the first set of OS functions is determined based at least in part on the one or more system calls.

3. The system of claim 1, wherein the first set of OS functions includes one or more of paging functions, caching functions, filesystem functions, networking functions, threading functions, profiling functions, scheduling functions, one or more networking protocol implementations, or one or more hardware device drivers.

4. The system of claim 1, wherein the computing device is further configured to:
identify, based at least in part on the first set of OS functions that the user-submitted code is expected to invoke when executed, a second variant of the plurality of variants,
wherein the second variant provides at least the first set of OS functions; and
determine that the first variant utilizes less of a first computing resource than the second variant.

5. The system of claim 4, wherein the first computing resource comprises one or more of processing time, processor capacity, bandwidth, memory, storage, or latency.

6. A computer-implemented method comprising:
receiving user-submitted code executable on an on-demand code execution system;
determining, based at least in part on the user-submitted code, a first set of operating system ("OS") functionality associated with executing the user-submitted code on the on-demand code execution system;
identifying, based at least in part on the first set of OS functionality associated with executing the user-submitted code, a first variant of a plurality of variants of an OS kernel to be used to provide the first set of OS functionality during execution of the user-submitted code, wherein individual variants of the plurality of variants provide different subsets of a set of OS functionality provided by the OS kernel; and
in response to a request to execute the user-submitted code, executing the user-submitted code on a first virtual machine instance, the first virtual machine instance having the first variant of the OS kernel.

7. The computer-implemented method of claim 6 further comprising provisioning the first virtual machine instance with the first variant of the OS kernel.

8. The computer-implemented method of claim 6 further comprising selecting the first virtual machine instance having the first variant of the OS kernel from a plurality of preconfigured virtual machine instances.

9. The computer-implemented method of claim 6, wherein identifying the first variant of the OS kernel is based at least in part on one or more previous executions of the user-submitted code.

10. The computer-implemented method of claim 6, wherein a portion of the user-submitted code requires at least one function that is not provided by the first variant of the OS kernel.

11. The computer-implemented method of claim 10 further comprising determining, based at least in part on one or more previous executions of the user-submitted code, a probability that the portion of the user-submitted code that requires the at least one function will be executed.

12. The computer-implemented method of claim 11 further comprising:
obtaining a first resource cost associated with the first variant of the OS kernel; and
obtaining a second resource cost associated with a second variant of the OS kernel,
wherein the second variant provides the at least one function,
wherein identifying the first variant of the OS kernel is based at least in part on the first resource cost, the second resource cost, and the probability that the portion of the user-submitted code that requires the at least one function will be executed.

13. The computer-implemented method of claim 10 further comprising:

determining, during execution of the user-submitted code on the first virtual machine instance, that the execution of the user-submitted code requires the at least one function; and executing the user-submitted code on a second virtual machine instance having a second variant of the OS kernel, wherein the second variant provides the at least one function.

14. The computer-implemented method of claim 13, wherein the second variant of the OS kernel corresponds to a default variant.

15. The computer-implemented method of claim 13 further comprising transferring state information from the first virtual machine instance to the second virtual machine instance.

16. One or more non-transitory computer-readable media including computer-executable instructions that, when executed on an on-demand code execution system, cause the on-demand code execution system to:

obtain user-submitted code executable on an on-demand code execution system;

determine, based at least in part on the user-submitted code, a first subset of operating system ("OS") functionality associated with executing the user-submitted code;

identify, based at least in part on the first subset of OS functionality associated with executing the user-submitted code, a first variant of an OS kernel from a plurality of variants of the OS kernel to provide the first subset of the OS functionality during execution of the user-submitted code, wherein individual variants of the plurality of variants of the OS kernel provide different subsets of a set of OS functionality, and wherein the first variant of the OS kernel provides at least the first subset of OS functionality; and in response to a request to execute the user-submitted code, execute the user-submitted code on a first virtual machine instance having the first variant of the OS kernel.

17. The non-transitory computer-readable media of claim 16 wherein the instructions further cause the on-demand code execution system to generate the first variant of the OS kernel.

18. The non-transitory computer-readable media of claim 17, wherein the first variant of the OS kernel comprises a microkernel and one or more system processes.

19. The non-transitory computer-readable media of claim 16, wherein the first variant of the OS kernel is selected from a plurality of predefined OS kernel configurations.

20. The non-transitory computer-readable media of claim 16, wherein the instructions further cause the on-demand code execution system to execute the user-submitted code on a second virtual machine instance having the first variant of the OS kernel in response to a second request to execute the user-submitted code.

* * * * *